US012770970B2

(12) United States Patent
Kang et al.

(10) Patent No.: US 12,770,970 B2
(45) Date of Patent: Oct. 20, 2026

(54) POUCH-SHAPED BATTERY CELL WITH IMPROVED SAFETY

(71) Applicant: LG Energy Solution, Ltd., Seoul (KR)

(72) Inventors: Gyung Soo Kang, Daejeon (KR); Mi Na Kim, Daejeon (KR); Hyung Kyun Yu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 641 days.

(21) Appl. No.: 18/035,225

(22) PCT Filed: Oct. 5, 2022

(86) PCT No.: PCT/KR2022/014968
§ 371 (c)(1),
(2) Date: May 3, 2023

(87) PCT Pub. No.: WO2023/075190
PCT Pub. Date: May 4, 2023

(65) Prior Publication Data
US 2023/0420792 A1 Dec. 28, 2023

(30) Foreign Application Priority Data
Nov. 1, 2021 (KR) ........................ 10-2021-0148144

(51) Int. Cl.
*H01M 50/105* (2021.01)
*H01M 50/342* (2021.01)

(52) U.S. Cl.
CPC ..... *H01M 50/3425* (2021.01); *H01M 50/105* (2021.01)

(58) Field of Classification Search
CPC ........................ H01M 50/105; H01M 50/3425
See application file for complete search history.

(56) References Cited

U.S. PATENT DOCUMENTS

2004/0038126 A1* 2/2004 Gu ...................... H01M 50/191 429/185
2010/0266881 A1* 10/2010 You ..................... H01M 50/124 429/56

(Continued)

FOREIGN PATENT DOCUMENTS

CN 103858250 A 6/2014
CN 105264690 A 1/2016

(Continued)

OTHER PUBLICATIONS

Search report from International Application No. PCT/KR2022/014968, mailed Jan. 12, 2023.

(Continued)

*Primary Examiner* — Osei K Amponsah
(74) *Attorney, Agent, or Firm* — Lerner David LLP

(57) ABSTRACT

The present invention relates to a pouch-shaped battery cell with improved safety, and more particularly to a pouch-shaped battery cell including an electrode assembly, a cell case constituted by an upper case and a lower case configured to define a space portion configured to receive the electrode assembly, and a rupture induction portion. The electrode assembly including a negative electrode, a separator, and a positive electrode. Whereby the rapture induction portion is configured to induce rupture of the cell case when the pressure in the cell case increases is provided in the space portion of the cell case.

10 Claims, 4 Drawing Sheets

(56) References Cited

U.S. PATENT DOCUMENTS

| | | | | |
|---|---|---|---|---|
| 2011/0104527 | A1* | 5/2011 | Choi | H01M 50/3425 29/623.2 |
| 2011/0123844 | A1* | 5/2011 | Bhardwaj | H01M 50/124 29/623.2 |
| 2011/0129702 | A1 | 6/2011 | Ahn et al. | |
| 2014/0212710 | A1 | 7/2014 | Min | |
| 2018/0233722 | A1 | 8/2018 | Holman et al. | |
| 2020/0251707 | A1 | 8/2020 | Han et al. | |
| 2022/0407171 | A1 | 12/2022 | Seo et al. | |

FOREIGN PATENT DOCUMENTS

| | | | |
|---|---|---|---|
| JP | 2010-186786 | A | 8/2010 |
| JP | 2015-049971 | A | 3/2015 |
| JP | 6174947 | B2 | 8/2017 |
| JP | 2019-133778 | A | 8/2019 |
| KR | 20050066654 | A | 6/2005 |
| KR | 20110075789 | A | 7/2011 |
| KR | 2013-0000014 | A | 1/2013 |
| KR | 20130115425 | A | 10/2013 |
| KR | 2015-0034498 | A | 4/2015 |
| KR | 20150083497 | A | 7/2015 |
| KR | 101753213 | B1 | 7/2017 |
| KR | 101811934 | B1 | 1/2018 |
| KR | 101927398 | B1 | 12/2018 |
| KR | 20190023648 | A | 3/2019 |
| KR | 20190032019 | A | 3/2019 |
| KR | 102009438 | B1 | 8/2019 |
| KR | 20210054825 | A | 5/2021 |

OTHER PUBLICATIONS

Extended European Search Report including Written Opinion for Application No. 22879574.6 dated Sep. 18, 2024. 7 pgs.

Japanese Office Action issued in JP 2023-522888 mailed Jun. 17, 2024 (3 pages).

Search Report dated Apr. 15, 2026 from the Office Action for Chinese Application No. 202280007282.0 issued Apr. 20, 2026 pp. 1-2.

* cited by examiner

【FIG. 1】
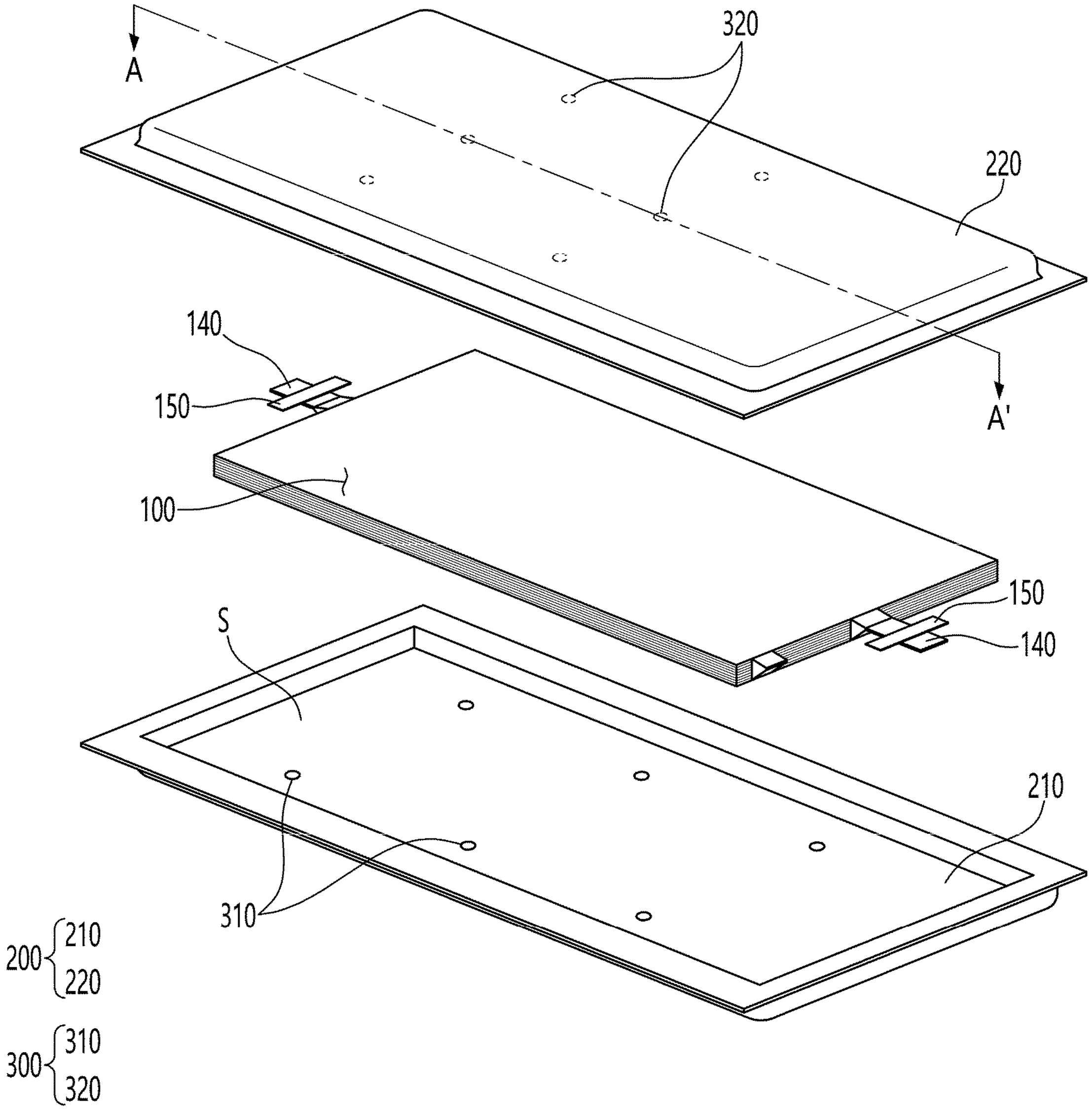

【FIG. 2】
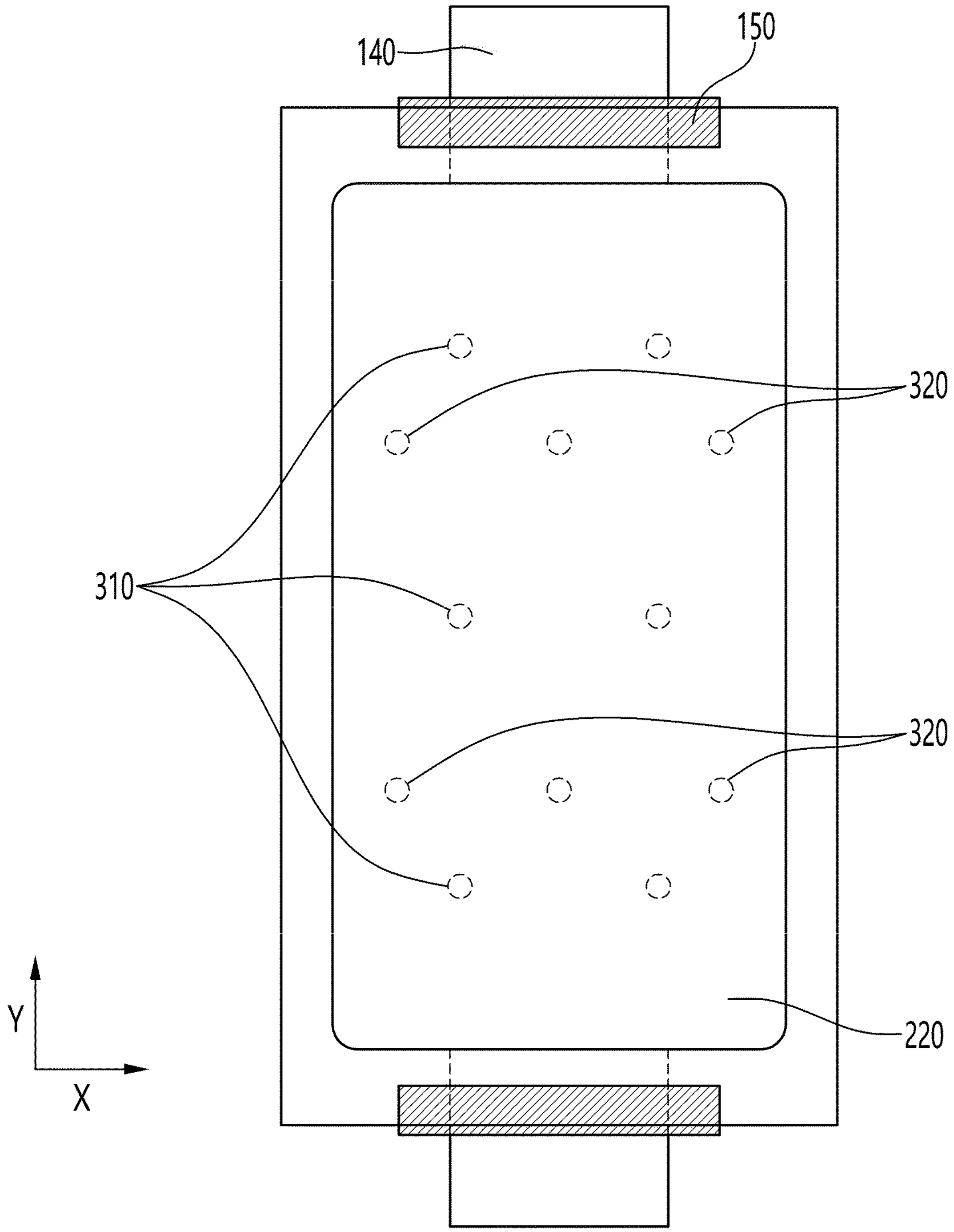

【FIG. 3】
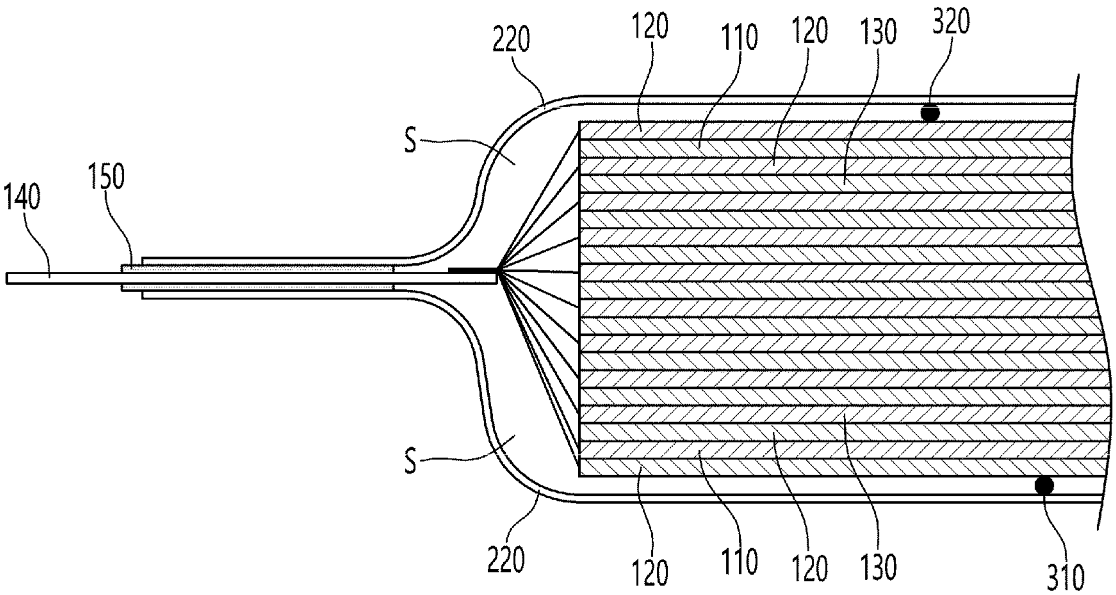
【FIG. 4】
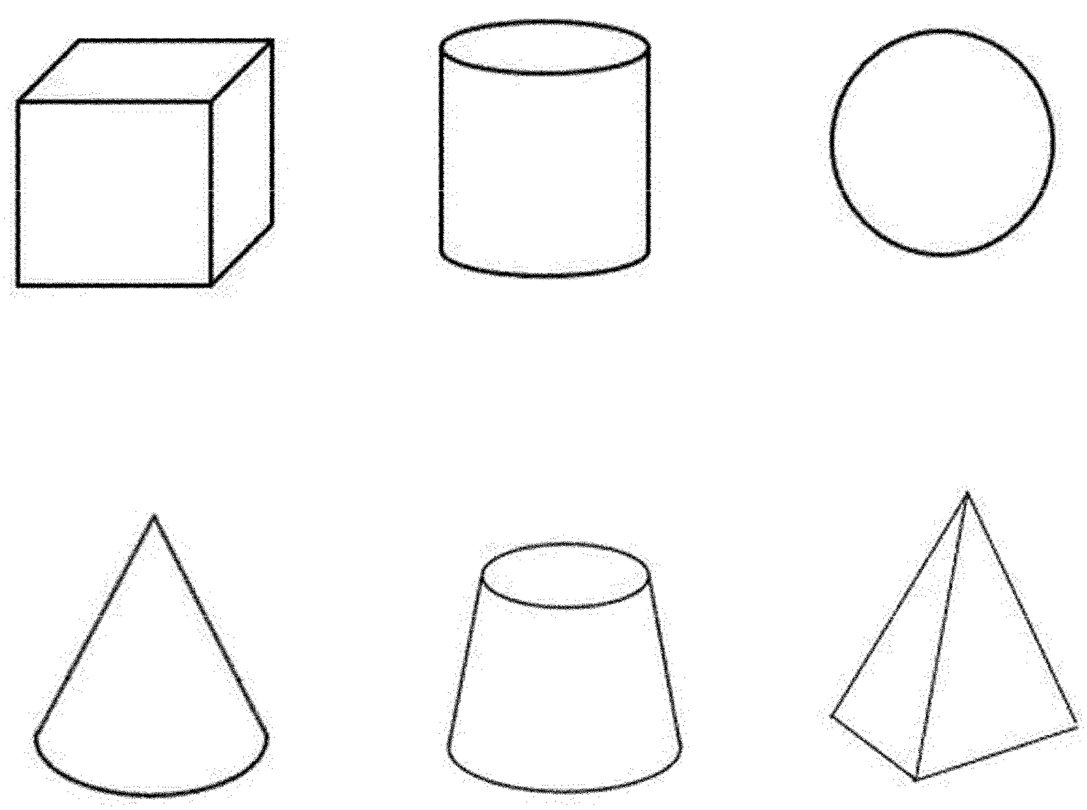

【FIG. 5】
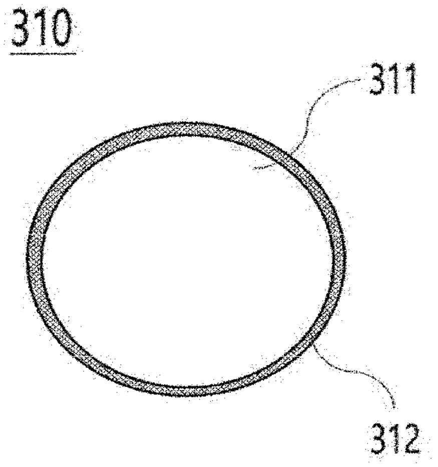
【FIG. 6】
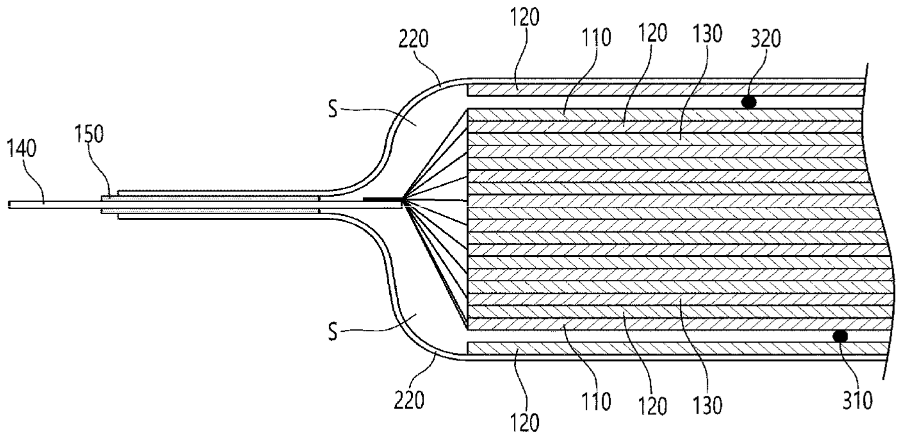
【FIG. 7】
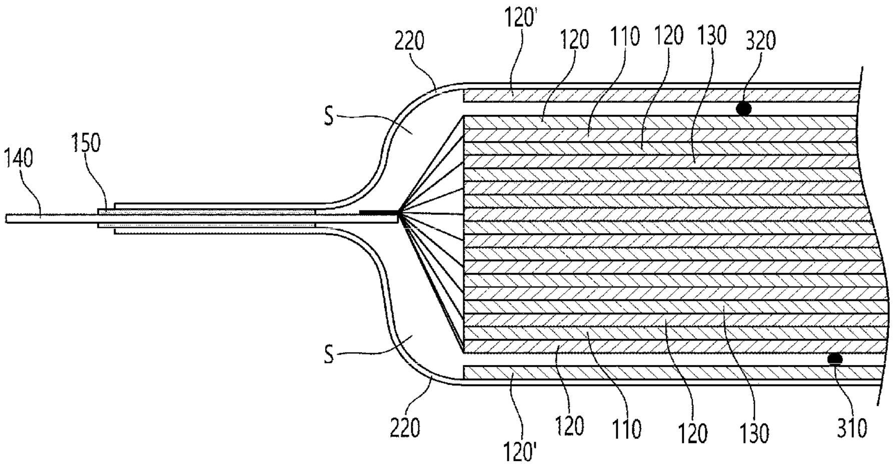

POUCH-SHAPED BATTERY CELL WITH IMPROVED SAFETY

CROSS-REFERENCE TO RELATED APPLICATIONS

This application is a national phase entry under U.S.C. § 371 of International Application No. PCT/KR2022/014968, filed Oct. 5, 2022 which claims the benefit of priority to Korean Patent Application No. 10-2021-0148144 filed on Nov. 1, 2021, the disclosure of which are incorporated herein by reference in their entireties.

TECHNICAL FIELD

The present invention relates to a pouch-shaped battery cell with improved safety, and more particularly to a pouch-shaped battery cell with improved safety configured such that a rupture induction portion is provided in a case in order to induce rupture of the case using pressure at the time of swelling and to easily distinguish between a front surface and a rear surface of the battery cell.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel cadmium battery, a nickel hydride battery, and a nickel zinc battery as secondary batteries that are widely used at present.

In general, such a secondary battery is configured such that an electrode assembly and an electrolytic solution are received in a battery case, and may be classified as a cylindrical battery having the electrode assembly mounted in a cylindrical metal can, a prismatic battery having the electrode assembly mounted in a prismatic metal can, or a pouch-shaped battery having the electrode assembly mounted in a cell case made of an aluminum laminate sheet based on the kind of the battery case.

Meanwhile, the secondary battery is repeatedly charged and discharged, and at this time heat is generated. Depending on circumstances, thermal runaway occurs due to short circuit, thermal shock, insulation breakdown, etc., which leads to a major accident, such as fire outbreak or explosion.

The reason for this is that a space in a negative electrode into which lithium ions deintercalated from a positive electrode during charging and discharging can be intercalated is insufficient, whereby the lithium ions may be deposited on a surface of the negative electrode as lithium metal, or metal impurities mixed during the manufacture of the battery are recrystallized and then come into contact with the positive electrode through a separator.

In particular, since, for the pouch-shaped battery cell, the case that encompasses the electrode assembly is thin and soft, unlike the cylindrical battery or the prismatic battery, more attention needs to be paid. Since the pouch-shaped battery cell is configured to have a structure in which the electrode assembly is merely sealed, however, there is no reliable safety means capable of securing safety.

PRIOR ART DOCUMENT (Patent Document 1) Korean Patent Application No. 2003-0097964

DISCLOSURE

Technical Problem

The present invention has been made in view of the above problems, and it is an object of the present invention to provide a pouch-shaped battery cell with improved safety capable of rupturing a case before thermal runaway occurs in the pouch-shaped battery cell, thereby preventing a secondary accident, such as fire outbreak or explosion.

It is another object of the present invention to provide a pouch-shaped battery cell with improved safety configured such that a front surface and a rear surface of the battery cell are easily identified at the time of manufacturing a battery module or a battery pack, whereby it is possible to improve speed and accuracy in manufacture.

Technical Solution

A pouch-shaped battery cell according to the present invention to accomplish the above objects includes an electrode assembly including a negative electrode, a separator, and a positive electrode, and a cell case constituted by a lower case and an upper case configured to define a space portion configured to receive the electrode assembly, wherein a rupture induction portion configured to induce rupture of the cell case when pressure in the cell case increases is provided in the space portion of the cell case.

Also, in the pouch-shaped battery cell according to the present invention, the rupture induction portion may have a cubic shape with a predetermined volume.

Also, in the pouch-shaped battery cell according to the present invention, the rupture induction portion may include a core portion (311) and a coating portion (312) configured to wrap the core portion(311), the core portion (311) may be made of a metal material, and the coating portion (312) may be made of a nonconductive resin.

Also, in the pouch-shaped battery cell according to the present invention, the rupture induction portion may be made of a nonconductive resin.

Also, in the pouch-shaped battery cell according to the present invention, the rupture induction portion may be provided in one or more between the electrode assembly and an inner surface of the lower case and/or between the electrode assembly and an inner surface of the upper case.

Also, in the pouch-shaped battery cell according to the present invention, when the rupture induction portion is provided in plural between the electrode assembly and the inner surface of the lower case and between the electrode assembly and the inner surface of the upper case, disposition structures of the rupture induction portions provided at the inner surface of the lower case and the inner surface of the upper case are different from each other.

Also, in the pouch-shaped battery cell according to the present invention, places of the lower case and/or the upper case at which the rupture induction portions may be disposed so as to protrude convexly.

Also, in the pouch-shaped battery cell according to the present invention, when the electrode assembly is configured in the sequence of a separator, a negative electrode, a separator, and a positive electrode in an inward direction from an outermost side, the rupture induction portion may be located between a separator located at the outermost side of the electrode assembly and the inner surface of the cell case.

Also, in the pouch-shaped battery cell according to the present invention, the rupture induction portion may be fixed to the separator located at the outermost side and/or the inner surface of the cell case.

Also, in the pouch-shaped battery cell according to the present invention, when the electrode assembly is configured in the sequence of a separator, a negative electrode, a separator, and a positive electrode in the inward direction from the outermost side, the rupture induction portion may be located between a separator located at the outermost side of the electrode assembly and a negative electrode located adjacent to the separator located at the outermost side.

Also, in the pouch-shaped battery cell according to the present invention, when the electrode assembly is configured in the sequence of an auxiliary separator, a separator, a negative electrode, a separator, and a positive electrode in the inward direction from the outermost side, the rupture induction portion may be located between an auxiliary separator of the electrode assembly and a separator located adjacent to the auxiliary separator.

In addition, the present invention provides a battery pack including the pouch-shaped battery cell.

Advantageous Effects

A pouch-shaped battery cell with improved safety according to the present invention has an advantage in that a rupture induction portion is provided in a cell case, whereby it is possible to induce rapid rupture of the case when a swelling phenomenon occurs in the case, and therefore it is possible to prevent fire outbreak or explosion.

Also, in the pouch-shaped battery cell with improved safety according to the present invention, disposition structures of rupture induction portions provided in an upper case and a lower case are different from each other, whereby it is possible to easily distinguish between a front surface and a rear surface of the battery cell, and therefore it is possible to improve speed and accuracy of a manufacturing process at the time of manufacturing a batter module or a battery pack.

DESCRIPTION OF DRAWINGS

FIG. 1 is an exploded perspective view of a pouch-shaped battery cell according to a first embodiment of the present invention.

FIG. 2 is a plan view of the pouch-shaped battery cell shown in FIG. 1.

FIG. 3 is a sectional view of a part of the pouch-shaped battery cell taken along line A-A' of FIG. 1.

FIG. 4 is a perspective view showing examples of a rupture induction portion according to a first embodiment of the present invention.

FIG. 5 is a sectional view of the rupture induction portion according to the first embodiment of the present invention.

FIG. 6 is a sectional view of a part of a secondary battery according to a second embodiment of the present invention.

FIG. 7 is a sectional view of a part of a secondary battery according to a third embodiment of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a pouch-shaped battery cell with improved safety according to the present invention will be described with reference to the accompanying drawings.

FIG. 1 is an exploded perspective view of a pouch-shaped battery cell according to a first embodiment of the present invention, FIG. 2 is a plan view of the pouch-shaped battery cell shown in FIG. 1, and FIG. 3 is a sectional view of a part of the pouch-shaped battery cell taken along line A-A' of FIG. 1.

The pouch-shaped battery cell with improved safety according to the present invention includes an electrode assembly 100, a cell case 200 configured to receive the electrode assembly 100, and a rupture induction portion 300.

First, the electrode assembly 100 received in the cell case 200 may be a jelly-roll type electrode assembly, which is configured to have a structure in which a long sheet type negative electrode 110 and a long sheet type positive electrode 130 are wound in the state in which a separator 120 is interposed therebetween, a stacked type electrode assembly including unit cells, each of which is configured to have a structure in which a rectangular positive electrode and a rectangular negative electrode are stacked in the state in which a separator is interposed therebetween, a stacked and folded type electrode assembly, which is configured to have a structure in which unit cells are wound using a long separation film, or a laminated and stacked type electrode assembly, which is configured to have a structure in which unit cells are stacked in the state in which a separator is interposed therebetween and are then attached to each other. However, the present invention is not limited thereto.

Specifically, the negative electrode 110 is manufactured by applying a slurry mixture of a negative electrode active material and a binder to a negative electrode current collector.

Here, as the negative electrode active material, for example, there may be used carbon, such as a non-graphitizing carbon or a graphite-based carbon; a metal composite oxide, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, 2, and 3 elements of the periodic table, halogen; $0<x\le 1$; $1\le y\le 3$; $1\le z\le 8$); lithium metal; a lithium alloy; a silicon-based alloy; a tin-based alloy; a metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; a conductive polymer, such as polyacetylene; a Li—Co—Ni-based material; or a Si-based material, such as Si, SiO, $SiO_2$, or a mixture thereof. However, the present invention is not limited thereto.

The positive electrode 130 is manufactured by applying a slurry mixture of a positive electrode active material and a binder to a positive electrode current collector.

The positive electrode active material may be constituted, for example, by a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; a Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}MxO_2$ (where M=Co, Ni, Fe, Cr, Zn, or Ta, and x=0.01 to 0.1) or the chemical formula $Li_2Mn_3MO_5$ (where M=Fe, Co, Ni, Cu, or Zn); $LiMn_2O_4$ in which a portion of Li in the chemical formula is replaced by alkaline earth metal ions; a disulfide compound; or $Fe_2(MoO_4)_3$. However, the present invention is not limited thereto.

Meanwhile, each of the negative electrode current collector and the positive electrode current collector is constituted by a portion having the slurry including the active material applied thereto and a non-coated portion having no slurry applied thereto, and the non-coated portion may be cut to form an electrode tab or a separate conductive member is connected to the non-coated portion by ultrasonic welding to form the electrode tab.

An electrode lead 140 is connected to the electrode tab by spot welding, and an insulative film 150 is located around the electrode lead 140.

Here, the insulative film 150 is located at a sealed portion at which a lower case 210 and an upper case 220 are thermally fused to each other in order to fix the electrode lead 140 to the cell case 200.

Consequently, the flow of electricity generated by the electrode assembly 100 to the cell case 200 via the electrode lead 140 is prevented, and sealing of the cell case 200 is maintained. Meanwhile, it is preferable for the insulative film 150 to be made of a material having poor conduction of electricity, i.e. a nonconductive material. In general, an insulative tape that has a relatively small thickness while being easily attached to the electrode lead 140 is mainly used; however, the present invention is not limited thereto.

Next, the cell case 200 will be described.

The cell case 200 is constituted by a lower case 210 and an upper case 220, and has a pocket type space portion S configured to receive the electrode assembly 100.

The cell case 200 is made of a laminate sheet including an outer coating layer, a metal layer, and an inner coating layer, and the space portion configured to receive the electrode assembly 100 is formed in the cell case.

The inner coating layer is disposed in direct contact with the electrode assembly 100, and therefore the inner coating layer must exhibit high insulation properties and high resistance to an electrolytic solution. In addition, the inner coating layer must exhibit high sealability in order to hermetically seal the cell case from the outside, i.e. a thermally-bonded sealed portion between inner layers must exhibit excellent thermal bonding strength.

The inner coating layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability; however, the present invention is not limited thereto, and polypropylene, which exhibits excellent mechanical properties, such as tensile strength, rigidity, surface hardness, and impact resistance, and excellent chemical resistance, may be most preferably used.

The metal layer, which is disposed so as to abut the inner coating layer, corresponds to a barrier layer configured to prevent moisture or various kinds of gas from permeating into the battery from the outside. An aluminum thin film, which is lightweight and easily shapeable, may be used as a preferred material for the metal layer.

The outer coating layer is provided on the other surface of the metal layer. The outer coating layer may be made of a heat-resistant polymer that exhibits excellent tensile strength, resistance to moisture permeation, and resistance to air transmission such that the outer coating layer exhibits high heat resistance and chemical resistance while protecting the electrode assembly. As an example, the outer coating layer may be made of nylon or polyethylene terephthalate; however, the present invention is not limited thereto.

Although the lower case 210 and the upper case 220 are shown as being completely separated from each other in the drawings, one edge of the lower case 210 and one edge of the upper case 220 may be connected to each other, or one of the lower case 210 and the upper case 220 may have a flat plate structure having no spaced portion therein.

Next, the rupture induction portion 300 received in the space portion S of the cell case 200 will be described.

The rupture induction portion 300 is a construction capable of inducing further swelling of the cell case 200 when the pressure in the cell case 200 increases due to swelling in order to rupture the cell case 200 and to interrupt connection with a corresponding lead before occurrence of thermal runaway as the result of rupturing the cell case, thereby minimizing secondary damage, such as fire outbreak or explosion.

FIG. 4 is a perspective view showing examples of a rupture induction portion according to a first embodiment of the present invention. Referring to FIGS. 1 to 4, the rupture induction portion 300 may have a cubic shape with a predetermined volume.

For example, the rupture induction portion may have a spherical shape, such as a round ball, a cubic shape formed by four or more flat surfaces, such as a polygonal column, a cone, a truncated cone, a truncated pyramid, or a shape formed by flat and curved surfaces, and the shape of the rupture induction portion is not particularly restricted as long as the rupture induction portion is configured to have a volume.

Here, although the size of the rupture induction portion is not particularly defined, it is preferable for the rupture induction portion to have a maximum inner diameter of 6 mm or less, since the rupture induction portion must be located between the electrode assembly 100 and an inner surface of the cell case 200.

It is preferable for the rupture induction portion 300 to be provided between the electrode assembly 100 and an inner surface of the lower case 210, between the electrode assembly 100 and an inner surface of the upper case 220, or between the electrode assembly 100 and the inner surface of the lower case 210 and between the electrode assembly 100 and the inner surface of the upper case 220, and it is more preferable for a plurality of rupture induction portions to be provided therebetween.

In particular, when the rupture induction portion is provided between the electrode assembly 100 and the inner surface of the lower case 210 and between the electrode assembly 100 and the inner surface of the upper case 220 and a plurality of rupture induction portions is provided therebetween, it is more preferable for the disposition structure of first rupture induction portions 310 located between the inner surface of the lower case 210 and the electrode assembly 100 and the disposition structure of second rupture induction portions 320 located between the inner surface of the upper case 220 and the electrode assembly 100 to be different from each other.

In general, a battery module is obtained by stacking a plurality of battery cells. At this time, the battery cells must be sequentially stacked in a predetermined direction. For the pouch-shaped battery cell having the space portion provided in each of the upper case and the lower case, however, it is difficult to easily identify the pouch-shaped battery cell, since the external shapes of the upper case and the lower case are similar to each other.

When the rupture induction portions 300 are provided at the inner surface of the upper case 220 and the inner surface of the lower case 210, however, outer surfaces of the lower case 210 and the upper case 220 may protrude so as to be slightly convex due to the volume of each of the rupture induction portions 300. Furthermore, since the disposition structures of rupture induction portions 300 provided at the inner surfaces of the respective cases are different from each other, it is possible to easily distinguish between the upper case 220 and the lower case 210 with the naked eye, whereby a stacking process may be easily performed and process accuracy may be improved.

Although a total of 6 (2×3) first rupture induction portions 310 are shown as being provided at the inner surface of the lower case 210 such that the first rupture induction portions are disposed by twos in a horizontal direction and the first rupture induction portions are disposed by threes in a vertical direction in the state in which the first rupture induction portions are spaced apart from each other by a predetermined distance and a total of 6 (3×2) second rupture induction portions 320 are shown as being provided at the inner surface of the upper case 220 such that the second rupture induction portions are disposed by threes in the horizontal direction and the second rupture induction portions are disposed by twos in the vertical direction in the state in which the second rupture induction portions are spaced apart from each other by a predetermined distance in FIGS. 1 and 2, which is merely an example, it is obvious that it is possible to variously change the number of rupture induction portions and the disposition structures thereof.

Meanwhile, in FIG. 3, the electrode assembly 100 configured in the sequence of the separator 120, the negative electrode 110, the separator 120, and the positive electrode 130 in an inward direction from the outermost side is received. At this time, the rupture induction portion 300 may be located between the separator 120 located at the outermost side of the electrode assembly 100 and the inner surface of the cell case 200.

Little space may be provided between the electrode assembly 100 and the inner surface of the cell case 200 in order to increase energy density, and therefore the fixed state of the rupture induction portion 300 may be maintained without a separate fixing means. However, an adhesive made of a known nonconductive material may be used in order to securely fix the rupture induction portion 300 at a desired position. Of course, it is obvious that the rupture induction portion 300 may be simultaneously formed during a process of forming the cell case 200.

Here, since the rupture induction portion 300 is disposed in direct contact with the electrode assembly 100, it is preferable for the rupture induction portion to be made of a nonconductive material not undergoing chemical reaction with an electrolytic solution, such as polypropylene, polyethylene, or polyimide resin.

FIG. 5 is a sectional view of the rupture induction portion according to the first embodiment of the present invention.

The first rupture induction portion 310 may be constituted by a core portion 311 and a coating portion 312 configured to wrap the core portion in order to minimize a reduction in volume thereof when the rupture induction portion 300 comes into strongly tight contact with the inner surface of the cell case 200 due to the pressure in the cell case 200.

Here, it is preferable for the core portion 311 to be made of a metal material, such as aluminum, and for the coating portion 312 to be made of a nonconductive material, such as polypropylene, polyethylene, or polyimide resin, in order to prevent electrical conduction between the core portion 311 and the electrode assembly 100.

Of course, it is obvious that the second rupture induction portion 320 may be constituted by a core portion and a coating portion, in the same manner as the first rupture induction portion 310.

FIG. 6 is a sectional view of a part of a secondary battery according to a second embodiment of the present invention.

The second embodiment is identical in construction to the first embodiment described with reference to FIGS. 1 to 5 except for the position of the rupture induction portion 300. Hereinafter, therefore, only the different construction will be described.

In the second embodiment, an electrode assembly 100 configured in the sequence of a separator 120, a negative electrode 110, a separator 120, and a positive electrode 130 in the inward direction from the outermost side is received. At this time, each of a first rupture induction portion 310 and a second rupture induction portion 320 may be located between a separator 120 located at the outermost side of the electrode assembly 100 and a negative electrode 110 located adjacent to the separator 120 located at the outermost side.

Each of the first rupture induction portion 310 and the second rupture induction portion 320 is inserted into the electrode assembly 100 during manufacture of the electrode assembly. In this case, the first rupture induction portion and the second rupture induction portion may be fixed to the electrode assembly without a separate fixing means.

Although the vicinity of each of the first rupture induction portion 310 and the second rupture induction portion 320 is shown as being empty in FIG. 6, this disposition is provided to describe the place at which each of the rupture induction portions is located in more detail, and the negative electrode 110 and the separator 120 are maintained in tight contact with each other.

FIG. 7 is a sectional view of a part of a secondary battery according to a third embodiment of the present invention.

The third embodiment is identical in construction to the first embodiment described with reference to FIGS. 1 to 5 except for the position of the rupture induction portion 300. Hereinafter, therefore, only the different construction will be described.

In the third embodiment, an electrode assembly 100 configured in the sequence of an auxiliary separator 120', a separator 120, a negative electrode 110, a separator 120, and a positive electrode 130 in the inward direction from the outermost side is received. At this time, each of a first rupture induction portion 310 and a second rupture induction portion 320 may be located between an auxiliary separator 120' of the electrode assembly 100 and a separator 120 located adjacent to the auxiliary separator 120'.

The auxiliary separator 120' is configured to wrap the separator 120 located at the outermost side once more in order to improve insulation. In the same manner as in the second embodiment, therefore, each of the first rupture induction portion 310 and the second rupture induction portion 320 is inserted into the electrode assembly 100 during manufacture of the electrode assembly, and the first rupture induction portion and the second rupture induction portion may be fixed to the electrode assembly without a separate fixing means.

In addition, although the vicinity of each of the first rupture induction portion 310 and the second rupture induction portion 320 is shown as being empty in FIG. 7, this disposition is provided to describe the place at which each of the rupture induction portions is located in more detail, and the separator 120 and the auxiliary separator 120' are in tight contact with each other.

A plurality of pouch-shaped battery cells may be stacked to constitute a battery module or a battery pack, and these may be used as a power supply source for various kinds of devices, such as an electric vehicle and an energy storage system.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Electrode assembly
110: Negative electrode
120: Separator
120': Auxiliary separator
130: Positive electrode
140: Electrode lead
150: Insulative film
200: Cell case
210: Lower case
220: Upper case
300: Rupture induction portion
310: First rupture induction portion
311: Core portion 312: coating portion
320: Second rupture induction portion

The invention claimed is:

1. A pouch-shaped battery cell comprising:
an electrode assembly comprising a negative electrode, a separator, and a positive electrode; and
a cell case including a lower case and an upper case configured to define a space portion configured to receive the electrode assembly, wherein
a rupture induction portion configured to induce rupture of the cell case when pressure in the cell case increases is provided in the space portion of the cell case,
wherein the rupture induction portion is located between the electrode assembly and an inner surface of the cell case,
wherein the rupture induction portion is located between the electrode assembly and an inner surface of the cell case such that the rupture induction portion pushes the inner surface of the cell case away from the electrode assembly, and
wherein
the rupture induction portion comprises a core portion and a coating portion configured to wrap the core portion,
the core portion is made of a metal material, and
the coating portion is made of a nonconductive resin.

2. The pouch-shaped battery cell according to claim 1, wherein the rupture induction portion has a cubic shape with a predetermined volume.

3. The pouch-shaped battery cell according to claim 2, wherein the rupture induction portion is provided in one or more between the electrode assembly and an inner surface of the lower case and/or between the electrode assembly and an inner surface of the upper case.

4. The pouch-shaped battery cell according to claim 3, wherein, when the rupture induction portion is provided in plural between the electrode assembly and the inner surface of the lower case and between the electrode assembly and the inner surface of the upper case, disposition structures of the rupture induction portions provided at the inner surface of the lower case and the inner surface of the upper case are different from each other.

5. The pouch-shaped battery cell according to claim 4, wherein the lower case and/or the upper case at places in which the rupture induction portions are disposed protrude convexly.

6. The pouch-shaped battery cell according to claim 2, wherein, when the electrode assembly is configured in a sequence of a separator, a negative electrode, a separator, and a positive electrode in an inward direction from an outermost side of the electrode assembly, the rupture induction portion is located between a separator located at the outermost side of the electrode assembly and an inner surface of the cell case.

7. The pouch-shaped battery cell according to claim 6, wherein the rupture induction portion is fixed to the separator located at the outermost side and/or the inner surface of the cell case.

8. The pouch-shaped battery cell according to claim 2, wherein, when the electrode assembly is configured in a sequence of the separator, a negative electrode, the separator, and the positive electrode in an inward direction from an outermost side, the rupture induction portion is located between the separator located at the outermost side of the electrode assembly and the negative electrode located adjacent to the separator located at the outermost side.

9. The pouch-shaped battery cell according to claim 2, wherein, when the electrode assembly is configured in a sequence of an auxiliary separator, the separator, the negative electrode, the separator, and the positive electrode in an inward direction from an outermost side, the rupture induction portion is located between the auxiliary separator of the electrode assembly and the separator located adjacent to the auxiliary separator.

10. A battery pack comprising the pouch-shaped battery cell according to claim 1.

* * * * *